United States Patent
Pasquer et al.

(10) Patent No.: US 6,988,692 B2
(45) Date of Patent: Jan. 24, 2006

(54) REAR FASTENING DEVICE FOR AIRCRAFT ENGINE

(75) Inventors: Félix Pasquer, Lieusaint (FR); Philippe Loewenstein, Saint Arnoult le Bourg (FR); Marc Tesniere, Champcueil (FR)

(73) Assignee: SNECMA Moteurs, Paris (FR)

( * ) Notice: Subject to any disclaimer, the term of this patent is extended or adjusted under 35 U.S.C. 154(b) by 0 days.

(21) Appl. No.: 10/838,243

(22) Filed: May 5, 2004

(65) Prior Publication Data

US 2004/0251379 A1    Dec. 16, 2004

(30) Foreign Application Priority Data

May 27, 2003   (FR)   ................. 03 06435

(51) Int. Cl.
*B64D 27/00* (2006.01)

(52) U.S. Cl. ........................................ 244/54
(58) Field of Classification Search ............. 244/53 R, 244/54, 55, 58, 60, 131
See application file for complete search history.

(56) References Cited

U.S. PATENT DOCUMENTS

| | | | | |
|---|---|---|---|---|
| 5,176,339 A | * | 1/1993 | Schmidt | 244/54 |
| 5,275,357 A | * | 1/1994 | Seelen et al. | 244/54 |
| 5,303,880 A | * | 4/1994 | Cencula et al. | 244/54 |
| 5,351,930 A | * | 10/1994 | Gwinn et al. | 248/557 |
| 5,620,154 A | * | 4/1997 | Hey | 244/54 |
| 5,649,417 A | * | 7/1997 | Hey | 60/797 |
| 5,725,181 A | * | 3/1998 | Hey | 244/54 |
| 5,860,623 A | * | 1/1999 | Dunstan et al. | 244/54 |
| 6,059,227 A | * | 5/2000 | Le Blaye et al. | 244/54 |
| 6,173,919 B1 | * | 1/2001 | Le Blaye | 244/54 |
| 6,330,995 B1 | * | 12/2001 | Mangeiga et al. | 248/554 |
| 6,494,403 B2 | * | 12/2002 | Jule et al. | 244/54 |
| 6,601,796 B2 | * | 8/2003 | Roszak | 244/54 |
| 6,607,165 B1 | * | 8/2003 | Manteiga et al. | 244/54 |
| 6,682,015 B2 | * | 1/2004 | Levert et al. | 244/54 |
| 6,758,438 B2 | * | 7/2004 | Brefort et al. | 244/54 |
| 6,843,449 B1 | * | 1/2005 | Manteiga et al. | 244/54 |
| 2003/0066928 A1 | * | 4/2003 | Brefort et al. | 244/54 |

FOREIGN PATENT DOCUMENTS

| | | |
|---|---|---|
| EP | 0 564 126 A1 | 10/1993 |
| EP | 0 741 074 A1 | 11/1996 |
| EP | 0 744 338 A1 | 11/1996 |
| EP | 1 031 507 A2 | 8/2000 |

* cited by examiner

*Primary Examiner*—Teri Pham Luu
*Assistant Examiner*—Stephen A. Holzen
(74) *Attorney, Agent, or Firm*—Oblon, Spivak, McClelland, Maier & Neustadt, P.C.

(57) ABSTRACT

A rear attachment suspension or device of a turbo engine to an aircraft pylon includes an upper brace fitted with a pylon fastening device and hinged by second ball joint connections, first and second rocker bars transversal to the longitudinal axis of the engine on both sides of the axis of the engine and a third rocker bar disposed there between. The rocker bars are linked to the engine by first ball joint connections. The first and second rocker bars each include a third stand-by link and the upper brace is formed of a beam fixed rigidly to the pylon. The rocker bars are designed to ensure their interchangeability, thereby reducing the risks of error during assembly.

7 Claims, 3 Drawing Sheets

REAR FASTENING DEVICE FOR AIRCRAFT ENGINE

BACKGROUND OF THE INVENTION (1) Field of the Invention

This invention relates to the suspension of propulsion engines to an aircraft structure. It relates in particular to a suspension or rear fastening device including means for retaining the suspension in case of accidental breakage of one of its parts.

(2) Description of the Related Art

A propulsion engine can be mounted at various places of an aircraft, for example suspended from a pylon integral with the structure thereof. It may be suspended under the wings, fastened to the fuselage or mounted in the tail unit by attachment means. The purpose of these attachment means is to ensure transmission of the mechanical loads between the engine and the aircraft structure. The loads to be taken into account are oriented along the three main directions. These are notably the weight of the engine, its thrust and the lateral aerodynamic loads. The loads to be transmitted also include the recovery of the rotation torque around the axis of the engine. Besides, these means must absorb the deformations undergone by the engine during the various phases of the flight by reason notably of the dimensional variations due to thermal expansions or contractions.

A suspension mode, for example, in the case of a fan-type turbo engine, consists in fastening the engine to a pylon integral with the wing structure of the aircraft using a front suspension or attachment and rear suspension or attachment. The front suspension is fastened in particular to the outer casing of the fan and the rear suspension to the exhaust casing of the primary flux.

According to a configuration known, the front attachment is arranged to ensure transmission of the vertical and tangential loads between the engine and the aircraft. The rear attachment is arranged for letting through the mechanical loads along the same directions, as well as to enable recovery of the engine torque around the axis of the turbo engine and the thrust recovery. The latter is transmitted via two thrust recovery bars attached, at the front, to the base of the fan casing on both sides of the longitudinal axis and, at the rear, by means of the rear suspension of the engine.

The present invention relates to an attachment arranged for transmitting the vertical and lateral loads between the engine and the pylon of the aircraft. It is the configuration of rear attachment reminded above.

The patent EP 527672 of the applicant describes an attachment of such type. It includes three outer attachment lugs or yokes which are provided as a single-piece at the upper section of the exhaust casing of the turbo reactor. These lugs enable to fasten the exhaust casing to the lower ends of three suspension rocker bars whereof the upper ends are mounted in an attachment structure arranged substantially as an arc of circle on a transversal plane with respect to the axis of the engine. This attachment structure includes a brace to which the rocker bars are attached via a longitudinal suspension axle. This brace is itself fixed under the pylon by appropriate means. Thanks to their arrangement, the rocker bars enable transmission of the traction and compression loads along their axis. The rocker bars are fixed at their other end to lugs or yokes of a lower brace integral with the exhaust casing.

The solution suggested in this patent relates to a means enabling to prevent the engine from coming apart in case when said brace should break mechanically.

The attachment devices also integrate generally safety means intended to prevent the engine from coming apart when a rocker bar, and not the brace, breaks. For example, we know means composed notably of elements which remain inactive under normal operating conditions of the engine, i.e. when the parts of the attachment device are intact. If either part breaks, the safety means become active. The elements take over from the faulty parts in the attachment device.

We know for example an attachment device, such as described in the patent U.S. Pat. No. 6,330,995, including a first connecting rod and a second connecting rod between both upper and lower braces. The first connecting rod is mounted using a ball joint connection to a lug of the engine, and using two distinct links to the upper brace whereof one is fitted with a ball joint, the other one is axial. The second connecting pin is associated with a lug of the engine via a ball joint connection and to the upper brace via a single ball joint connection under normal operation. A second connection is provided, but for the latter the connecting pin is mounted to its counterpart with a backlash. Under normal operation, this second connection remains therefore inactive. The device includes a third connecting rod, between both braces, which remains in stand-by also by the presence of backlashes between the connecting pin and their respective housing on the braces. Under normal operation, the transmission of the loads is performed by the first of the connecting rods by reason of both its connecting pins with the upper brace. The second connecting rod transmits the tension and contraction loads by reason of its assembly with a single connection.

If the second connecting rod breaks, both braces pivot with respect to one another around the first connecting rod in order to eliminate the initial backlashes on the third connecting rod. The latter becomes actives and replaces the second connecting rod. If the first connecting rod breaks, the backlashes of the second connecting rod are eliminated as well as the backlash of the third link of the second connecting rod. There again, the suspension fulfills its function further without any alterations in its performances.

It may be observed that the first and second connecting rods are in the form of a boomerang and exhibit certain symmetry. They are, however, not interchangeable since one of the axes of the second connecting rod is mounted with a backlash whereas the three axes are active in the first.

This type of arrangement involves machining specific parts. Each connecting rod has a unique position in the suspension. There are therefore as many references as parts forming the attachment device. This does not imply optimum savings in manufacture and management.

Besides, both main connecting rods are quasi identical in shape. During assembly, the technician must adhere to very accurate operating mode and proceed with greatest care. The risk of mistakably assembling a part instead of another is not negligible.

The applicant has set himself as a target to provide a device for attaching an engine to the aircraft structure, whereof the risks of error during assembly are brought back to a minimum.

It also aims at the realisation of a device including interchangeable parts. It would be therefore possible to perform the assembly with a number of different parts smaller than in the solutions of the previous art. Not only would the risk of error be reduced, but also the costs of manufacture, maintenance and stock management.

BRIEF SUMMARY OF THE INVENTION

The invention meets these targets with a device for attaching a turbo engine to an aircraft pylon including an upper brace fitted with pylon fastening means, whereon are hinged by first ball joint connections, three rocker bars arranged on a plane transversal to the longitudinal axis of the engine, a first and a second rocker bars on both sides of the axis of the engine and a third rocker bar between both of them, the rocker bars being themselves linked with the engine by second ball joint connections, characterised in that the first and second rocker bars each include a third stand-by link and in that the upper brace is formed of a beam fixed rigidly to the pylon.

In particular, at least one of both stand-by links is provided as a ball joint connection with a pivot pin mounted with a backlash in its housing. Notably, each stand-by link is a ball joint connection with a longitudinal pivot pin mounted with a backlash in its housing, both backlashes being identical.

The third stand-by connection links the connecting rod to the upper brace.

Preferably, the first and second connecting rods are identical. Thus, thanks to the invention, there is provided an attachment device with safety means including a small number of different parts.

According to another characteristic, the first and second hinged connection means include a ball joint connection enabling to absorb the load components which are not oriented perpendicular to the longitudinal pivot pin.

BRIEF DESCRIPTION OF THE DRAWINGS

Other characteristics and advantages will appear when reading the following description, with the appended drawings wherein:

FIG. 4 shows a front view of a rocker bar with the different connections.

DETAILED DESCRIPTION OF THE PREFERRED EMBODIMENTS

Figure 1:
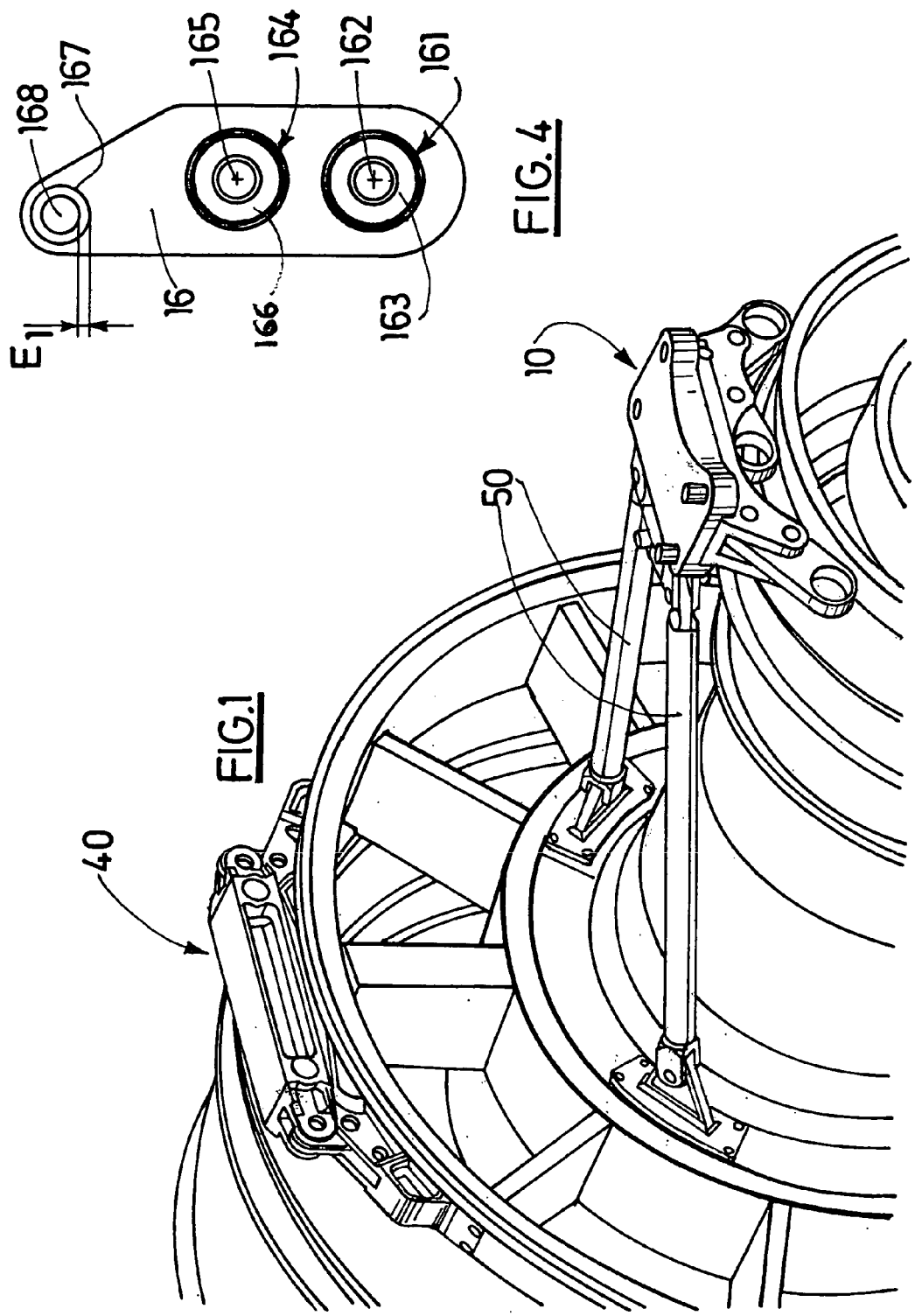
FIG. 1 represents an overview of the assembly of an engine to an aircraft pylon.

FIG. 1 represents a rear three-quarter view of a turbo reactor 1 fitted with its attachment means to an aircraft pylon which is not represented. It may be notably an attachment to an aircraft wing. According to this suspension mode, the engine includes an attachment device 40 at the front of the engine, fixed to the outer casing of the fan. It also includes an attachment means 10 at the rear, fixed to the exhaust casing of the primary flux. The thrust recovery is ensured by two bars 50 attached to the base of the fan and to the rear attachment.

Figure 2:
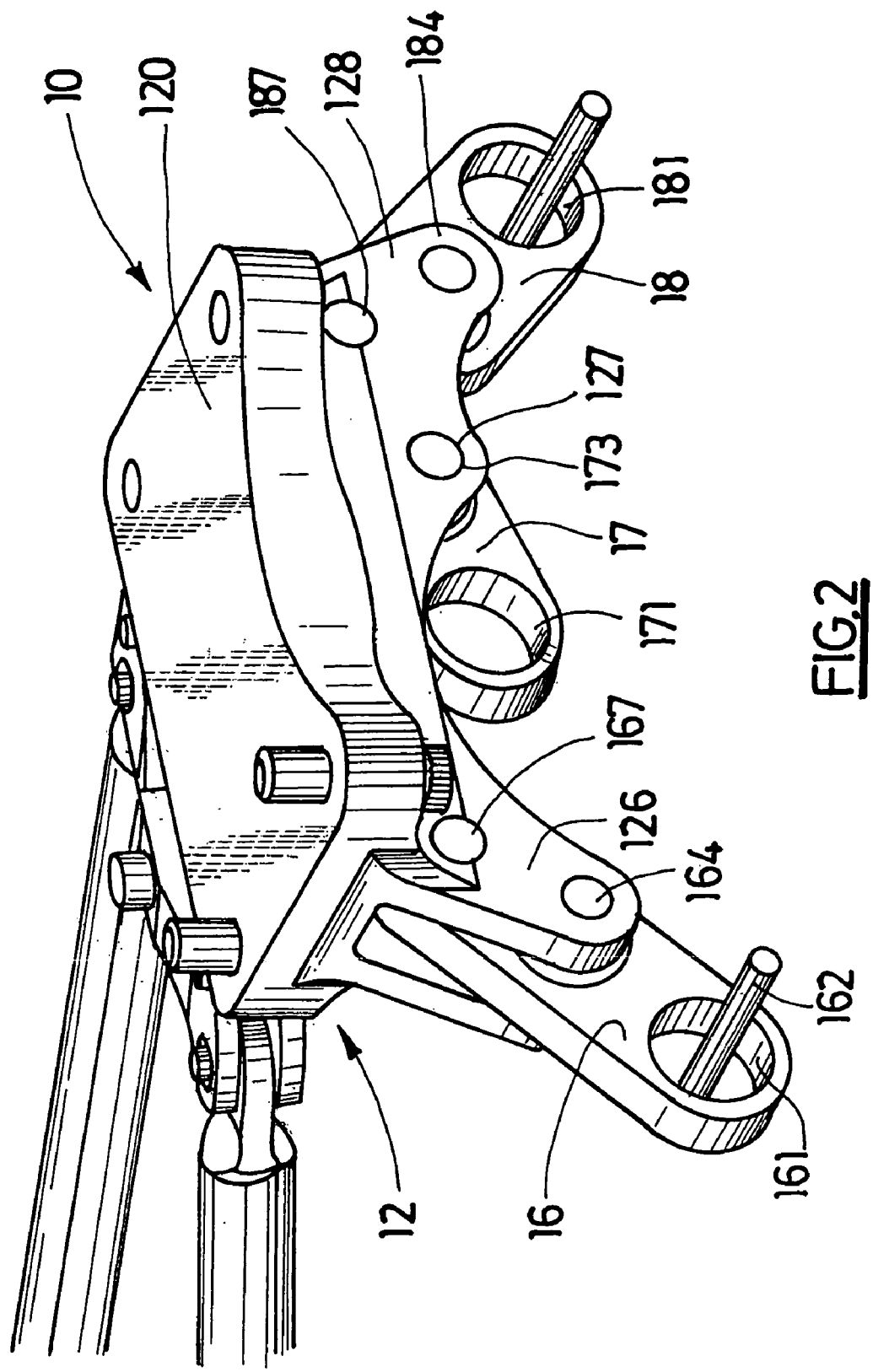
FIG. 2 represents in perspective the engine assembly device according to the invention.
Figure 3:
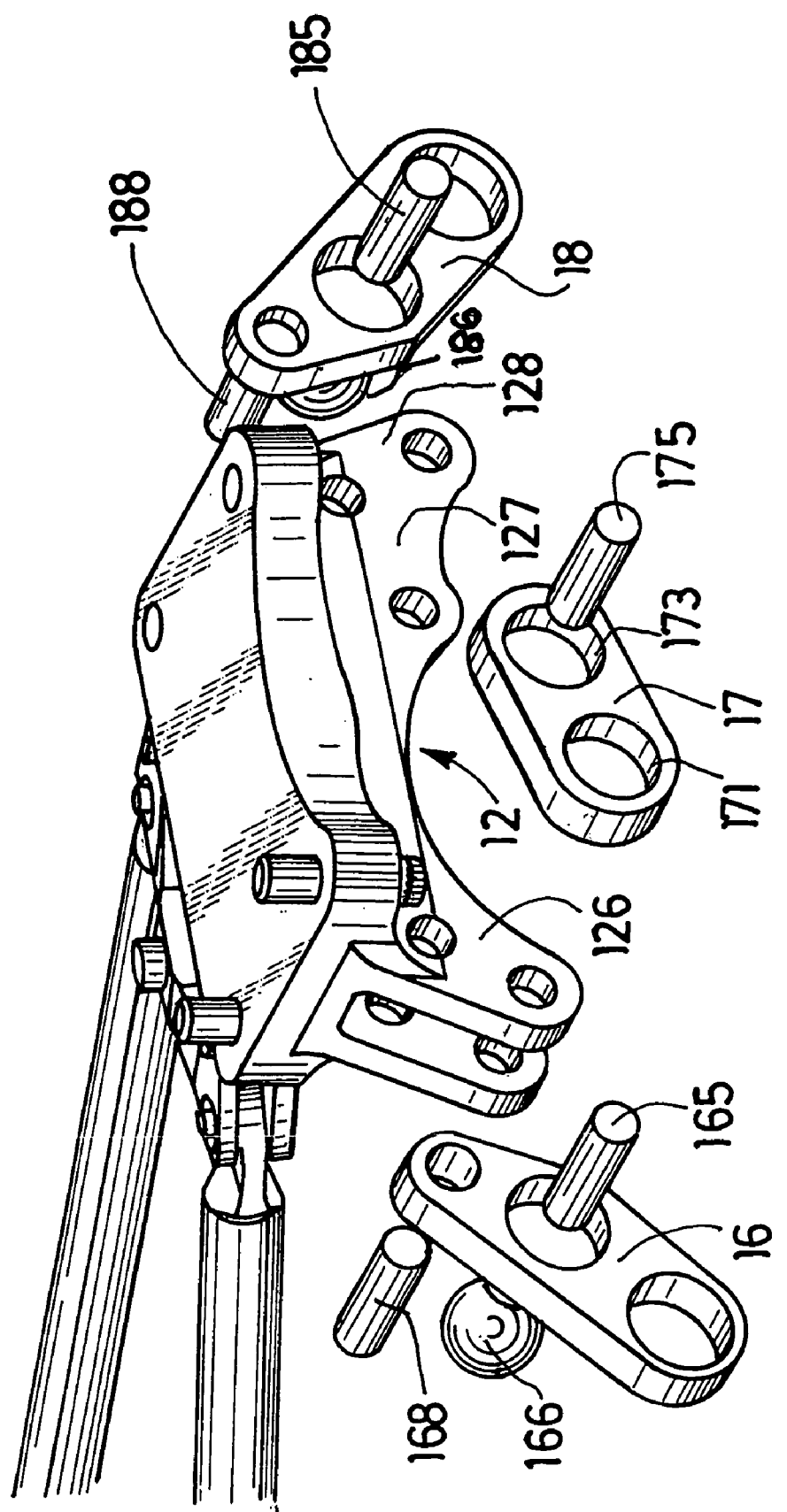
FIG. 3 represents the device of FIG. 2 as an exploded view.

This invention relates the rear attachment described hereunder in relation to FIGS. 2 to 4. The attachment 10 is composed of an upper brace 12 and of three connecting rods 16, 17 and 18 linking the brace 12 to lugs or yokes integral with the exhaust casing, not represented. Advantageously, these lugs are the components of a single lower brace. According to the embodiment represented, the connecting rods are rectilinear.

The upper brace is formed of a beam 120 with, here, four housings for letting through bolts or screws wherewith the brace is made integral rigidly with the pylon of the aircraft. The beam is substantially rectangular in shape; it is arranged transversally with respect to the longitudinal axis of the engine. The beam is extended on both sides of the engine by two yokes, 126 and 128 respectively, for linking with the connecting rods, 16 and 18 respectively. A third yoke 127 interconnected with the beam below, provides a link with the connecting rod 17.

The detail of the links is as follows. The connecting rod 16 is for example associated with a yoke of the engine via a first link 161 with a pin 162. The pin 162 goes through the lugs forming the yoke of the engine as well as the connecting rod 16 and is held by appropriate sockets. Advantageously, the socket 163 visible on FIG. 4 between the pin 161 and the connecting rod has an outer spherical surface in order to provide a ball joint connection. The loads exerted between the connecting rod and the yoke, and not on the plane orthogonal to the pin 162, are thereby not transmitted. This type of connection is well-known in itself in the art. The ball joint connection exhibits the particularity of transmitting only the traction and compression loads via the pin 162. The ball joint 163 has not been represented on FIG. 2.

The connecting rod 16 is associated with the yoke 126 via a second link 164 which, here, is advantageously also fitted with a ball joint, like the first one. It comprises a pin 165 and a socket with a spherical surface 166 on the connecting rod 16. The pin 165 is rotatably mounted in housings provided in the yoke 126 by dint of appropriate sockets.

According to the invention, the connecting rod 16 is associated with the yoke 126 via a third pivot pin 167 which is in stand-by. By this expression is meant a connection which in normal operation remains inactive; it does not transmit any loads. It becomes active and transmits loads in case of breakage of set parts of the attachment. There is provided such a link, for instance, by dint of a pin 168 mounted with radial backlash E1 in housings aligned on the connecting rod on the one hand and on the yoke 126 on the other. The backlash is sufficient for the pin to remain inactive in all the flight phases.

The connecting rod 18 comprises like the connecting rod 16 a first ball joint connection 181 and a pin 182 with a yoke of the engine. On FIG. 2, the ball joint has not been represented. It is linked by a second ball joint connection 184 and pin 185 to the yoke 128. It also comprises a stand-by connection 187 with the yoke 128. This link is preferably provided as in the yoke 126, by dint of a pin 188 mounted with a set radial backlash E2 in housings aligned on the yoke and connecting rod.

Advantageously, the backlashes E1 and E2 are identical. Moreover, by reason of the symmetry of the structure and of the means forming the attachment, both connecting rods have the same shape, preferably, and are interchangeable. They are advantageously rectilinear.

A third connecting rod 17, arranged between the first two, includes a linking means 171 with a yoke interconnected with the engine. The pin 172 goes through the connecting rod and the lugs of the yoke along a direction longitudinal with respect to the engine. A second linking means 173 is composed of a pin 175 going through the connecting rod 17 and the yoke 127 on the upper brace 12.

The operating mode of the device which has just been described is explained hereunder.

Under normal operation, the loads situated on the plane perpendicular to the axis of the engine, i.e. the loads having a vertical and/or lateral component, are transmitted from the engine to the pylon via the upper brace, the first and second linking means and the upper brace. Both rocker bars 16 and 18 are tilted symmetrically with respect to the vertical direction going through the axis of the engine. They are arranged as a trapezoid. Both these connecting rods transmit for instance to the structure of the aircraft the weight of the engine and the lateral loads to which it is subjected during flight. Both stand-by connections 167 and 187 are inactive. By reason of the backlashes E1 and E2, no load is transmitted over these connections, regardless of the flight phase.

The third connecting rod is tilted with respect to the horizontal. It is arranged close to the vertical plane going through the axis of the engine, and transmits to the carrying structure the torque exerted by the casing due to the rotation of the engine.

In case when the connecting rod 16 for instance breaks, there is a toggle between both braces around the connecting rod 18 until the radial backlash of the third connection 187 has disappeared. This displacement also occurs in case of failure of another part situated in the path of the loads going through the connecting rod 16, such as the beam of the upper brace, a lug of the yoke 146 or a ball joint connection.

The connection between both braces then becomes rigid. This connection ensures transmission both of the vertical and/or lateral loads and also the torque due to the rotation of the engine.

In case when it is the connecting rod 18 that breaks, the transmission of the mechanical loads is then ensured by the assembly, then formed rigidly by the connecting rods 16 and 17.

In case when it is the connecting rod 17 that breaks and if the backlashes E1 and E2 are identical, both backlashes are eliminated similarly and the link provided by both connecting rods 16 and 18 becomes rigid. To take this breakage hypothesis into account, one may also anticipate that both backlashes are different, thereby promoting the transmission of the mechanical loads via either connecting rod.

What is claimed is:

1. A device to attach an aircraft gas turbine engine to an aircraft pylon, comprising:
    an upper brace configured to be connected to the aircraft pylon;
    first and second connecting rods each having a stand-by link and being connected to the engine and to the upper brace by ball-joint connections; and
    a third connecting rod being connected to the engine and to the upper brace by ball-joint connections and being disposed between the first and second connecting rods, wherein said first and second connecting rods are disposed on opposite sides of a longitudinal axis of the engine and said connecting rods are disposed substantially transverse to the longitudinal axis of the engine, wherein said connecting rods are rectilinear.

2. A device to attach an aircraft gas turbine engine to an aircraft pylon, comprising:
    an upper brace configured to be connected to the aircraft pylon;
    first and second connecting rods each having a stand-by link having a backlash and being connected to the engine and to the upper brace by ball-joint connections; and
    a third connecting rod being connected to the engine and to the upper brace by ball-joint connections and being disposed between the first and second connecting rods, wherein said first and second connecting rods are disposed on opposite sides of a longitudinal axis of the engine and said connecting rods are disposed substantially transverse to the longitudinal axis of the engine, wherein backlashes in the stand-by links in the first and second connecting rods are identical to each other.

3. A device to attach an aircraft gas turbine engine to an aircraft pylon, comprising:
    an upper brace configured to be connected to the aircraft pylon;
    first and second connecting rods each having a stand-by link and being connected to the engine and to the upper brace by ball-joint connections; and
    a third connecting rod being connected to the engine and to the upper brace by ball-joint connections and being disposed between the first and second connecting rods, wherein said first and second connecting rods are disposed on opposite sides of a longitudinal axis of the engine and said connecting rods are disposed substantially transverse to the longitudinal axis of the engine, wherein the first connecting rod is interchangeable with the second connecting rod.

4. A device to attach an aircraft gas turbine engine to an aircraft pylon, comprising:
    an upper brace configured to be connected to the aircraft pylon;
    first and second connecting rods each having a stand-by link and being connected to the engine and to the upper brace by ball-joint connections; and
    a third connecting rod being connected to the engine and to the upper brace by ball-joint connections and being disposed between the first and second connecting rods, wherein said first and second connecting rods are disposed on opposite sides of a longitudinal axis of the engine and said connecting rods are disposed substantially transverse to the longitudinal axis of the engine, wherein the third connecting rod is tilted with respect to a horizontal direction and configured to transmit to a carrying structure a torque exerted by an engine casing due to a rotation of the engine.

5. A device configured to attach a turbo engine to an aircraft pylon including an upper brace fitted with pylon fastening means, whereon three connecting rods are each hinged by first ball joint connections, the three connecting rods being transverse to a longitudinal axis of the engine, a first connecting rod of said connecting rods being disposed on one side of the longitudinal axis of the engine, a second connecting rod of said connecting rods being disposed on the second side of the engine's longitudinal axis, and a third of said connecting rods being disposed between said first and second connecting rods, the connecting rods being themselves linked with the engine by second ball joint connections, wherein the first and second connecting rods each include a stand-by link having a backlash and wherein the upper brace is formed of a beam fixed rigidly to the pylon, wherein backlashes in the stand-by links in the first and second connecting rods are identical to each other.

6. A device configured to attach a turbo engine to an aircraft pylon including an upper brace fitted with pylon fastening means, whereon three connecting rods are each hinged by first ball joint connections, the three connecting rods being transverse to a longitudinal axis of the engine, a first connecting rod of said connecting rods being disposed on one side of the longitudinal axis of the engine, a second connecting rod of said connecting rods being disposed on the second side of the engine's longitudinal axis, and a third of said connecting rods being disposed between said first and second connecting rods, the connecting rods being themselves linked with the engine by second ball joint connections, wherein the first and second connecting rods each include a stand-by link and wherein the upper brace is formed of a beam fixed rigidly to the pylon, wherein the first connecting rod is interchangeable with the second connecting rod.

7. A device configured to attach a turbo engine to an aircraft pylon including an upper brace fitted with pylon fastening means, whereon three connecting rods are each hinged by first ball joint connections, the three connecting rods being transverse to a longitudinal axis of the engine, a first connecting rod of said connecting rods being disposed on one side of the longitudinal axis of the engine, a second connecting rod of said connecting rods being disposed on the second side of the engine's longitudinal axis, and a third of said connecting rods being disposed between said first and second connecting rods, the connecting rods being themselves linked with the engine by second ball joint connections, wherein the first and second connecting rods each include a stand-by link and wherein the upper brace is formed of a beam fixed rigidly to the pylon, wherein the third connecting rod is tilted with respect to a horizontal direction and configured to transmit to a carrying structure a torque exerted by an engine casing due to a rotation of the engine.

* * * * *